US006985942B2

(12) United States Patent
D'Annunzio et al.

(10) Patent No.: US 6,985,942 B2
(45) Date of Patent: Jan. 10, 2006

(54) AIRBORNE IP ADDRESS STRUCTURE

(75) Inventors: Michael A. D'Annunzio, Redmond, WA (US); Vincent D. Skahan, Jr., Federal Way, WA (US)

(73) Assignee: The Boeing Company, Chicago, IL (US)

( * ) Notice: Subject to any disclaimer, the term of this patent is extended or adjusted under 35 U.S.C. 154(b) by 728 days.

(21) Appl. No.: 09/938,006

(22) Filed: Aug. 23, 2001

(65) Prior Publication Data

US 2003/0084174 A1 May 1, 2003

(51) Int. Cl.
*G06F 15/173* (2006.01)
(52) U.S. Cl. .................... 709/224; 455/408; 455/431
(58) Field of Classification Search ............... 709/224; 455/408, 431
See application file for complete search history.

(56) References Cited

U.S. PATENT DOCUMENTS

| 5,612,703 | A |   | 3/1997  | Mallinckrodt |
|-----------|---|---|---------|--------------|
| 5,736,959 | A |   | 4/1998  | Patterson et al. |
| 5,847,679 | A |   | 12/1998 | Yee et al. |
| 6,018,659 | A |   | 1/2000  | Ayyagari et al. |
| 6,130,892 | A |   | 10/2000 | Short et al. |
| 6,131,119 | A | * | 10/2000 | Fukui .......................... 709/224 |
| 6,507,739 | B1 | * | 1/2003 | Gross et al. ................. 455/431 |
| 6,795,699 | B1 | * | 9/2004 | McCraw et al. ............. 455/408 |

FOREIGN PATENT DOCUMENTS

EP          0 890 907 A1      1/1999

OTHER PUBLICATIONS

PCT WO 00/63806; Oct. 26, 2000.
PCT WO 01/20824 A1; Mar. 22, 2001.
PCT WO 00/14987; Mar. 16, 2000.

* cited by examiner

*Primary Examiner*—Viet D. Vu
*Assistant Examiner*—Jinsong Hu
(74) *Attorney, Agent, or Firm*—Harness Dickey & Pierce P.L.C.

(57) ABSTRACT

An Internet protocol (IP) networking architecture includes a command and control sub-network (CCN) interconnecting a plurality of control interfaces wherein each control interface has a corresponding logical CCN address. A passenger services sub-network (PSN) interconnects a plurality of passenger interfaces wherein each passenger interface has a corresponding logical PSN address. The architecture further includes an air-to-ground sub-network (AGN) providing Internet access to the passenger interfaces via one or more isolation systems having corresponding logical CCN address and corresponding logical PSN address. By providing the isolation systems with multiple logical addresses, devices communicating on the AGN and PSN can be blocked from accessing the CCN addresses.

18 Claims, 2 Drawing Sheets

AIRBORNE IP ADDRESS STRUCTURE

BACKGROUND OF THE INVENTION

1. Technical Field

The present invention generally relates to aircraft networking. More particularly, the invention relates to an internet protocol (IP) networking architecture and method for structuring IP addresses, within an aircraft that simplifies routing and enhances security.

2. Discussion

In the aviation industry, the development of aircraft technologies has commonly centered around enhancing safety, reducing costs and improving the services available to onboard passengers. With regard to passenger services, the primary focus of most technologies has been communication and entertainment options available to passengers. In particular, passenger services such as media servers (e.g., movie delivery), on-board telephones and seat terminals have all evolved in recent years.

With the increasing popularity of the Internet, certain shortcomings associated with conventional seat terminals have become apparent. For example, the traditional seat terminal has a processor and a seat back display mounted in each seat, and the passengers do not have the option of supplying their own devices. With the widespread popularity of laptops, palm-held computers, etc., it is easy to understand that such a limitation is significant. This is particularly true considering the desirability of accessing the Internet from these devices. In fact, it is well known that conventional seat terminals lack the ability to provide off-board communications to the passenger altogether (with the exception of telephone service).

Another concern associated with providing Internet access to passengers is aircraft security. For example, it is critical that passengers not be able to access certain command and control interfaces within the aircraft while at the time being able to send and receive IP packets to interfaces throughout the world. It is also important to note that devices out on the network must be similarly blocked from accessing these confidential interfaces. The consequences of failing to adequately isolate command and control interfaces are dire. It should be noted that achieving such a level of security is particularly difficult considering the fact that certain crew interfaces might also desire access to the Internet.

An additional concern relates to IP routing. Specifically, the routing tables used by ground routers contain route entries for destination IP addresses in order to accurately route packages to their final destinations on the aircraft. It will be appreciated, therefore, that requiring a route entry for each seat of each aircraft on the network would result in prohibitively large routing tables on the ground. The same concerns are true for the airborne router located on the aircraft. In fact, it is easy to envision an airborne router routing table having on the order of five hundred route entries for the various interfaces disposed throughout the aircraft. It is therefore desirable to provide an IP networking architecture that enables the use of passenger-supplied computing devices, blocks passenger access to command and control interfaces, and simplifies routing tables.

SUMMARY OF THE INVENTION

The above and other objectives are provided by an Internet protocol (IP) networking architecture for an aircraft in accordance with the present invention. The architecture has a command and control sub-network (CCN) interconnecting a plurality of control interfaces wherein each control interface has a corresponding logical CCN address. A passenger services sub-network (PSN) interconnects a plurality of passenger interfaces wherein each passenger interface has a corresponding logical PSN address. The architecture further includes an air-to-ground sub-network (AGN) providing Internet access to the passenger interfaces via one or more isolation systems having corresponding logical CCN addresses and corresponding logical PSN addresses. By providing the isolation systems with multiple logical addresses, devices communicating on the AGN and PSN can be blocked from accessing the CCN addresses.

In another aspect of the invention, a method for structuring IP addresses within an aircraft is provided. The method includes the step of assigning logical CCN addresses to a plurality of control interfaces. Logical PSN addresses are assigned to a plurality of passenger interfaces. The method further provides for assigning a logical CCN address, a logical PSN address, and a logical AGN address to an isolation system such that devices communicating on the AGN and the PSN are blocked from accessing the CCN addresses.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings, in which:

DETAILED DESCRIPTION OF THE PREFERRED EMBODIMENTS

The following description of the preferred embodiment(s) is merely exemplary in nature and is in no way intended to limit the invention, its application, or uses.

Figure 1:
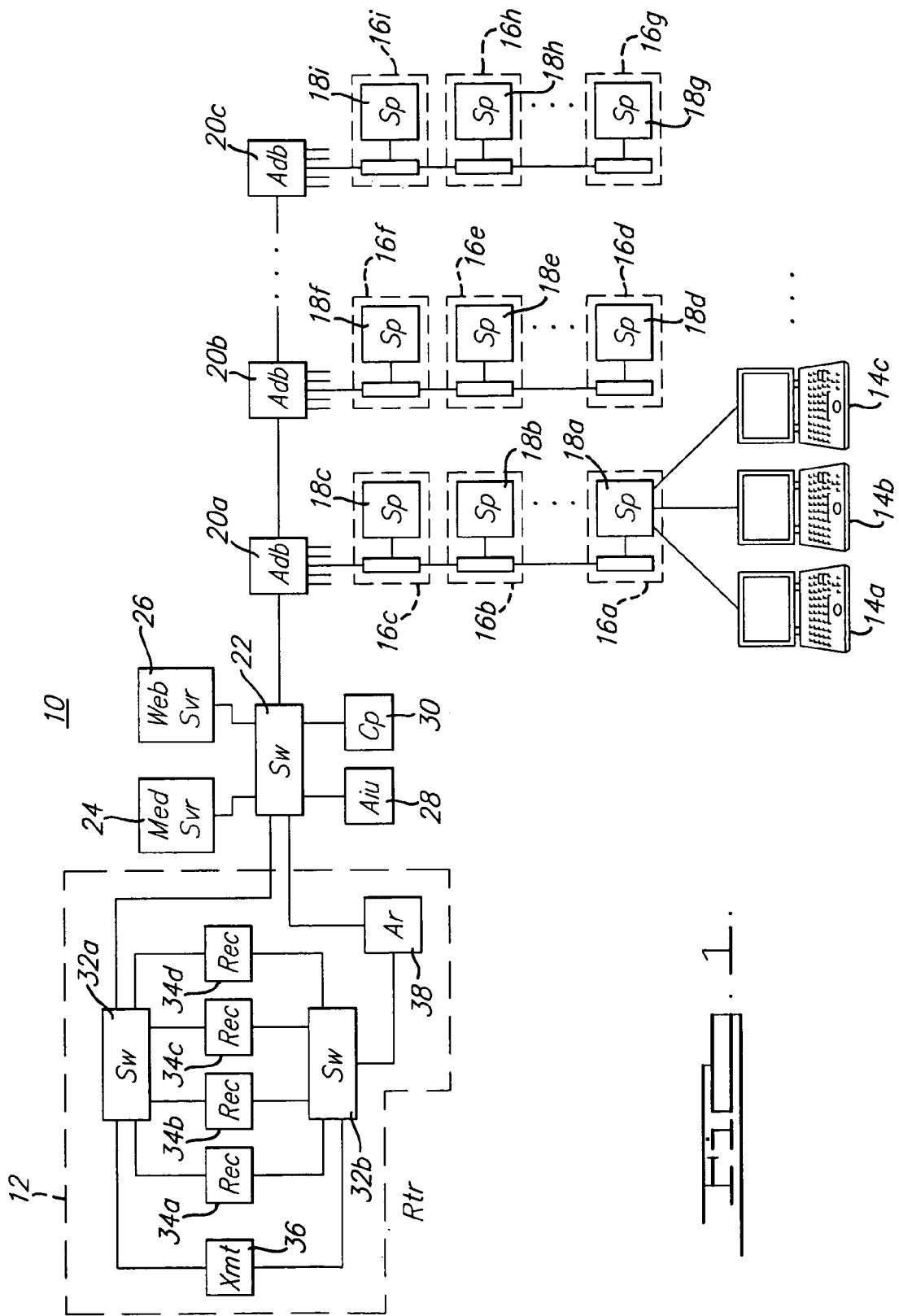
FIG. 1 is a block diagram of an aircraft electronics network model in accordance with the principles of the present invention.

Turning now to FIG. 1, a model of an aircraft electronics network 10 is shown. Generally, it can be seen that a data transceiver and router (DTR) 12 provides passenger-supplied computing devices 14 with the ability to send and receive packetized data via the widely known Internet protocol (IP). Specifically, the computing devices 14 can connect (via ethernet, USB, firewire, etc.) to a seat electronics box (SEB) 16, wherein each SEB 16 has a seat processor 18 for "routing" packets to and from the computing devices 14. The addressing scheme for this function is described in greater detail below. One or more area distribution boxes 20 serve as hubs for the SEBs 16.

An ethernet switch 22 manages traffic between the area distribution boxes 20, a media server 24, a web server 26, an aircraft interface unit 28, a control panel 30, and the RTR 12. The DTR 12 preferably has a plurality of ethernet switches 32 for managing traffic between receiving modules 34, a transmit module 36, and an airborne router 38.

Figure 2:
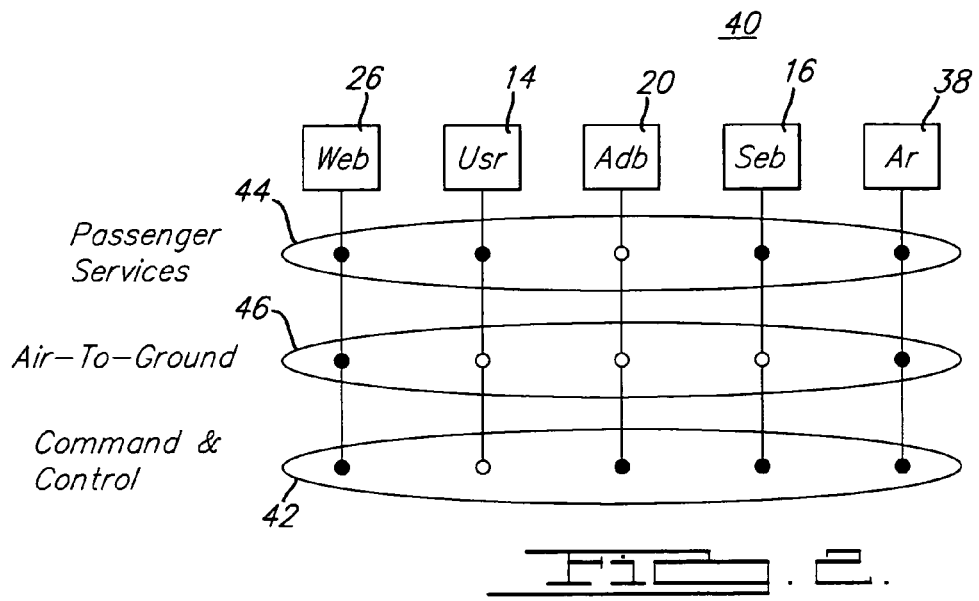
FIG. 2 is a diagram of an IP networking architecture for an aircraft in accordance with the principles of the present invention.

Turning now to FIG. 2, it can be seen that the IP networking architecture 40 of the present invention defines multiple sub-networks, wherein each network has a specific primary function. Since many of the onboard systems are members of more than one of these sub-networks, the sub-networks can be viewed as subnet overlays. Specifically, it can be seen that the architecture 40 has a command and control sub-network (CCN) 42, a passenger services sub-network (PSN) 44, and an air-to-ground sub-network (AGN) 46.

It can be seen that IP aliasing allows multiple IP addresses to be configured on a single physical network interface. For example, the web server 26 has a physical network interface that has an IP address for all three of the sub-networks. It will be appreciated that only the airborne router 38 can forward traffic between subnets. This feature simplifies router and host-based packet filtering to control inter-subnet access. IP aliasing also allows access to critical application ports to be restricted to specific subnets. For example, simple network management protocol (SNMP) ports can only be accessed from the CCN. Futhermore, the above approach allows maximum use of private address ranges and reuse of address ranges between aircraft. As will be discussed in greater detail below, the number of subnets that must be advertised to the ground is also minimized to one (namely the AGN).

Thus, the present invention provides isolation because packets cannot pass between addressed subnets unless they pass through an isolation system such as the airborne router 38. Furthermore, segregating packets by address range facilitates packet filtering. Filtering is facilitated by the fact that the packets are easily classified (according to source and destination address). Additionally, simple policies such as "if source address=PSN and destination address=CCN, then reject packet" can be readily defined and enforced.

Thus, it will be appreciated that the CCN 42 interconnects a plurality of control interfaces wherein each control interface has a corresponding logical CCN address. FIG. 2 illustrates that the control interfaces include the web server 26, the address distribution boxes 20, the SEBs 16, and the airborne router 38. The PSN 44 interconnects a plurality of passenger interfaces, wherein each passenger interface has a corresponding PSN address. It can be seen that the passenger interfaces include the web server 26, the computing devices 14, the SEBs 16, and the airborne router 38.

The AGN provides Internet access to the passenger interfaces via one or more isolation systems such as the web server 26 and the airborne router 38. The isolation systems have corresponding logical CCN addresses and corresponding logical PSN addresses such that devices communicating on the AGN and the PSN are blocked from accessing the CCN addresses. The various sub-networks will be described in greater detail below.

Air-to-Ground Sub-Network (AGN)

It will be appreciated that only onboard devices that are directly managed or controlled from the network operations center (NOC) will be assigned addresses from the AGN subnet range. All SNMP traffic, RTS control, content pushed from the ground to the aircraft, billing information, and port address translation (PAT) of passenger addresses for off-board Internet connectivity will be performed on this network. It will be appreciated that each airborne network is uniquely identified within a given domain and that the AGN is the only subnet advertised to the ground. Subnetting is therefore used to distinguish between airborne and ground subnets and to create unique aircraft identifiers (ACID).

It is preferred that the AGN uses private class A subnet: 10.0.0.0/22. A 22-bit subnet mask is defined that borrows 14 bits from the host part (14 bits for subnets and 10 bits for hosts). The 14-bit ACID therefore supports 16,382 unique airborne networks. The 10-bit field [d . . . d] is used to identify hosts. This field therefore supports up to 1,022 hosts or other devices. Thus,

| ACID | Device |
|---|---|
| [10.] [aaaaaaaaaaaaaa] | [dddddddddd] |
| 10.aaaaaaaa.aaaaaadd.dddddddd/22 | |

The device number field ranges can be defined as follows.

TABLE 1

| | |
|---|---|
| DTR | 1–6 |
| Port Address Translation | 7–8 |
| Area Distribution Boxes | 9–24 |
| Seat Electronic Boxes | 25–424 |
| Web/Media/Other Services | 425–432 |
| Crew Information System Services | 433–442 |
| Aircraft Interface Unit | 443 |
| Control Panel | 444–450 |
| Laptop Power Controllers | 954–969 |
| Expanded Services Devices | 970–989 |
| HCA | 990–1005 |
| Business Jet Receivers | 1006–1009 |
| ASPAC | 1010 |

It can be seen in Table 1 that all network address translations by convention use a device field having a value of 7 or 8. Since only passenger-sourced traffic is translated by the NAT gateway, this convention allows ground-based security systems to easily identify passenger traffic. Traffic to/from onboard systems such as the web portal 26 or media server 24, and all SNMP traffic can be easily identified and isolated from passenger traffic. It will therefore be appreciated that the above-described isolation systems have logical AGN addresses corresponding to an ACID such that the aircraft has a unique subnet address. The airborne router 38 can be defined as one of the isolation systems, where the airborne router has a device identifier such that the ACID and the device identifier define the logical AGN address for the airborne router. Similarly, the web server 26 can be defined as one of the isolation systems, where the web server 26 has a device identifier such that the ACID and the device identifier define the logical AGN address for the web server. Table 1 illustrates that various crew interfaces are provided with internet access by the AGN, wherein each crew interface has a corresponding logical AGN address.

Command and Control Sub-Network (CCN)

It will be appreciated that the CCN supports local command and control functions such as built-in test (BIT), configuration, initialization, data load, etc. The CCN excludes passengers devices by not assigning computing devices 14 addresses from the CCN address space. It is preferred that the class B private address range 172.16.0.0/ 16 is used for the CCN and is reused on each aircraft. It is important to note that CCN devices do not communicate directly to the ground using CCN addresses. Furthermore, the CCN is not advertised to the ground and CCN addresses are not translated (i.e., no NAT). The device field is used not for routing, but rather for address administration and can be defined as follows:

```
[172.16] [ x – LLL – DDDDDDDDDDDD]
16-Bits  1-Bit 3-Bits        12-Bits
where
LLLL = (100=Seatbox, 010=Server, 011=Network Element
X = not currently used (always set to "0")
```

Thus, an SEB address in the CCN address space would be as follows:

```
[172.16] [ x – LLL – DDD – CCC – BBBBB]
16-Bits 1-Bit 3-Bits 4-Bits 3-Bits 5-Bits
[172.16] [0 – 100 – 0010 – 100 – 01000]
[172.16] [01000010.10001000]
        172 . 16 . 66 . 136
```

Where,
 LLL=100=Seatbox
 D=Area Distribution Box (2)
 C=Column (4)
 B=Seatbox (16)
 X=not used (always set to "0")

It will therefore be appreciated that the SEBs 16 can be defined as being control interfaces such that the SEBs 16 have corresponding logical CCN addresses. Furthermore, the area distribution boxes 20 can be defined as being control interfaces such that the area distribution boxes 20 have logical CCN addresses.

Passenger Services Sub-Network (PSN)

As already discussed, the PSN is the onboard network that provides direct services to passengers. Thus, passengers boarding with computing devices 14 are assigned PSN addresses. Furthermore, all onboard devices that provide direct user services are assigned PSN addresses. Thus, the web server 26, media server 24, airborne router 38, and SEBs 16 can all be defined as passenger interfaces having corresponding logical PSN addresses.

It is preferred that the PSN addresses include two class B addresses supernetted together, wherein the first 15 bits make up the prefix. As in the case of the CCN addresses, the address range of the PSN addresses is reused on each aircraft. It will further be appreciated that the PSN addresses are translated by a NAT function for off-board access. Thus, PSN addresses are translated into an AGN address from the NAT address pool.

An exemplary PSN address for an SEB is as follows.

```
[172.18] [DDDD – CCC – BBBBB – U – PPPP]
15-Bits  4-Bits 3-Bits 5-Bits 1-Bit 4-Bits
[172 . ] [0001001D . DDDCCCBB . BBBUPPP]
```

Figure 3:
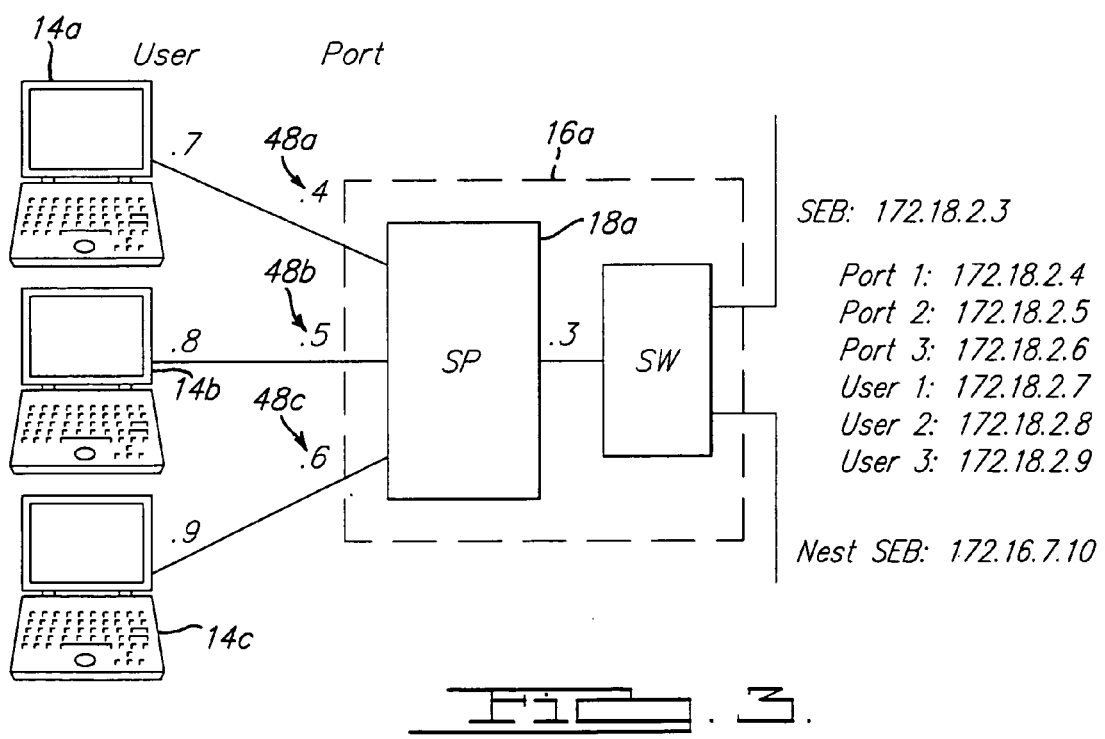
FIG. 3 is a diagram demonstrating a seat electronics box having an address resolution protocol (ARP) proxy.

Where,
 D=Area Distribution Box
 C=Column
 B=Seatbox
 U=User (0 indicates seatbox address, 1 indicates passenger address)
 P=Port Turning now to FIG. 3, it can be seen that the seat processor 18*a* functions in accordance with an address resolution protocol (ARP). Specifically, the seat processor performs a proxy ARP function which makes the addresses assigned to the user devices appear to be on the SEB network. Without proxy ARP, each user would appear to be attached to the seat processor through a separate subnet requiring a routing table entry in the airborne router. Thus, using an ARP proxy enables a reduction in address requirements and a reduction in the size of the routing table used by the airborne router. The ports 48 can therefore be defined as being one of the passenger interfaces wherein the ports 48 have logical PSN addresses for which the logical PSN address of the SEB 16*a* serves as a proxy. Furthermore, the passenger-supplied computing devices 14 can be defined as being one of the passenger interfaces, wherein the computing devices 14 have logical PSN addresses for which the logical PSN address of the SEB 16*a* serves as a proxy.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. An Internet protocol (IP) networking architecture for a mobile platform, the architecture comprising:
 a command and control sub-network (CCN) interconnecting a plurality of control interfaces wherein each control interface has a corresponding logical CCN address;
 a passenger services sub-network (PSN) interconnecting a plurality of passenger interfaces wherein each said passenger interface has a corresponding logical PSN address; and
 an air-to-ground sub-network (AGN) providing Internet access to the passenger interfaces via at least one isolation system having corresponding logical CCN addresses and corresponding logical PSN addresses such that devices communicating on the AGN and the PSN are blocked from accessing the CCN addresses by the one isolation system;
 wherein a seat electronics box is defined as one of the passenger interfaces, the logical PSN address of the seat electronics box acting as a proxy address for devices coupled to the seat electronics box, the seat electronics box having a seat processor for translating PSN addresses into AGN addresses.

2. The architecture of claim 1, wherein the at least one isolation system has a logical AGN addresses corresponding to a mobile platform identifier such that the mobile platform has a unique subnet address.

3. The architecture of claim 2, wherein a router comprises the at least one isolation system, the router having a device identifier such that the mobile platform identifier and the device identifier define the logical AGN address for the router.

4. The architecture of claim 2, wherein a web server comprises the at least one isolation system, the web server having a device identifier such that the mobile platform identifier and the device identifier define the logical AGN address for the web server.

5. The architecture of claim 1 wherein a port is defined as one of the passenger interfaces, the port having a logical PSN address for which the logical PSN address of the seat electronics box serves as a proxy address.

6. The architecture of claim 1, wherein a passenger-supplied computing device comprises one of the passenger interfaces, the passenger-supplied computing device having a logical PSN address for which the logical PSN address of the seat electronics box serves as a proxy address.

7. The architecture of claim 1 wherein one or more seat electronics boxes are defined as being control interfaces such that the seat electronics boxes have corresponding logical CCN addresses.

8. The architecture of claim 7 wherein one or more area distribution boxes are defined as being control interfaces such that the area distribution boxes have corresponding logical CCN addresses, the area distribution boxes serving as hubs for the seat electronics boxes.

9. The architecture of claim 1 wherein the AGN further provides access via a wide area network to a plurality of crew interfaces, wherein each said crew interface has a corresponding logical AGN address.

10. The architecture of claim 9 wherein a mobile platform interface unit comprises one of the crew interfaces such that the mobile platform interface unit has a corresponding logical AGN address.

11. The architecture of claim 9 wherein a control panel is defined as one of the crew interfaces such that the control panel has a corresponding logical AGN address.

12. The architecture of claim 9 wherein a media server is defined as one of the crew interfaces such that the media server has a corresponding logical AGN address.

13. An IP networking architecture for a mobile platform, the architecture comprising:
   a command and control sub-network (CCN) interconnecting a plurality of seat electronics boxes and area distribution boxes, the seat electronics boxes and area distribution boxes being defined as control interfaces such that each control interface has a corresponding logical CCN address;
   said area distribution boxes serving as hubs for the seat electronics boxes;
   a passenger services sub-network (PSN) interconnecting a plurality of passenger interfaces wherein each said passenger interface has a corresponding logical PSN address;
   said seat electronics boxes being further defined as passenger interfaces such that the seat electronics boxes have corresponding logical PSN addresses acting as a proxy address for devices coupled to the seat electronics box; and
   an air-to-ground sub-network (AGN) providing Internet access to the passenger interfaces via at least one isolation system having corresponding logical CCN addresses and corresponding logical PSN addresses such that devices communicating on the AGN and the PSN are blocked from accessing the CCN addresses by the one isolation system;
   the seat electronics box having a seat processor for translating PSN addresses into AGN addresses;
   said AGN further providing Internet access to a plurality of crew interfaces wherein each crew interface has a corresponding logical AGN address.

14. The architecture of claim 13 wherein the at least one isolation system has a logical AGN address corresponding to a mobile platform identifier such that the mobile platform has a unique subnet address.

15. A method for structuring Internet protocol (IP) addresses within a mobile platform, the method comprising the steps of:
   assigning logical command and control sub-network (CCN) addresses to a plurality of control interfaces;
   assigning logical passenger services sub-network (PSN) addresses to a plurality of passenger interfaces; and
   assigning a logical CCN address, a logical PSN address and a logical air-to-ground sub-network (AGN) address to at least one isolation system such that devices communicating on the AGN and the PSN are blocked from accessing the CCN addresses by the one isolation system;
   using a seat electronics box as one of the passenger interfaces;
   using the logical PSN address of the seat electronics box to act as a proxy address for devices coupled to the seat electronics box; and
   using the seat electronics box to translate PSN addresses into AGN addresses.

16. The method of claim 15 further including assigning a mobile platform identifier to the logical AGN address of the one isolation system such that the mobile platform has a unique subnet address.

17. The method of claim 16 further including using a router as the one isolation system, the router having a device identifier such that the mobile platform identifier and the device identifier define the logical AGN address for the router.

18. The method of claim 16 further including using a web server as the one isolation system, the web server having a device identifier such that the mobile platform identifier and the device identifier define the logical AGN address for the web server.

* * * * *